No. 782,689. Patented February 14, 1905.

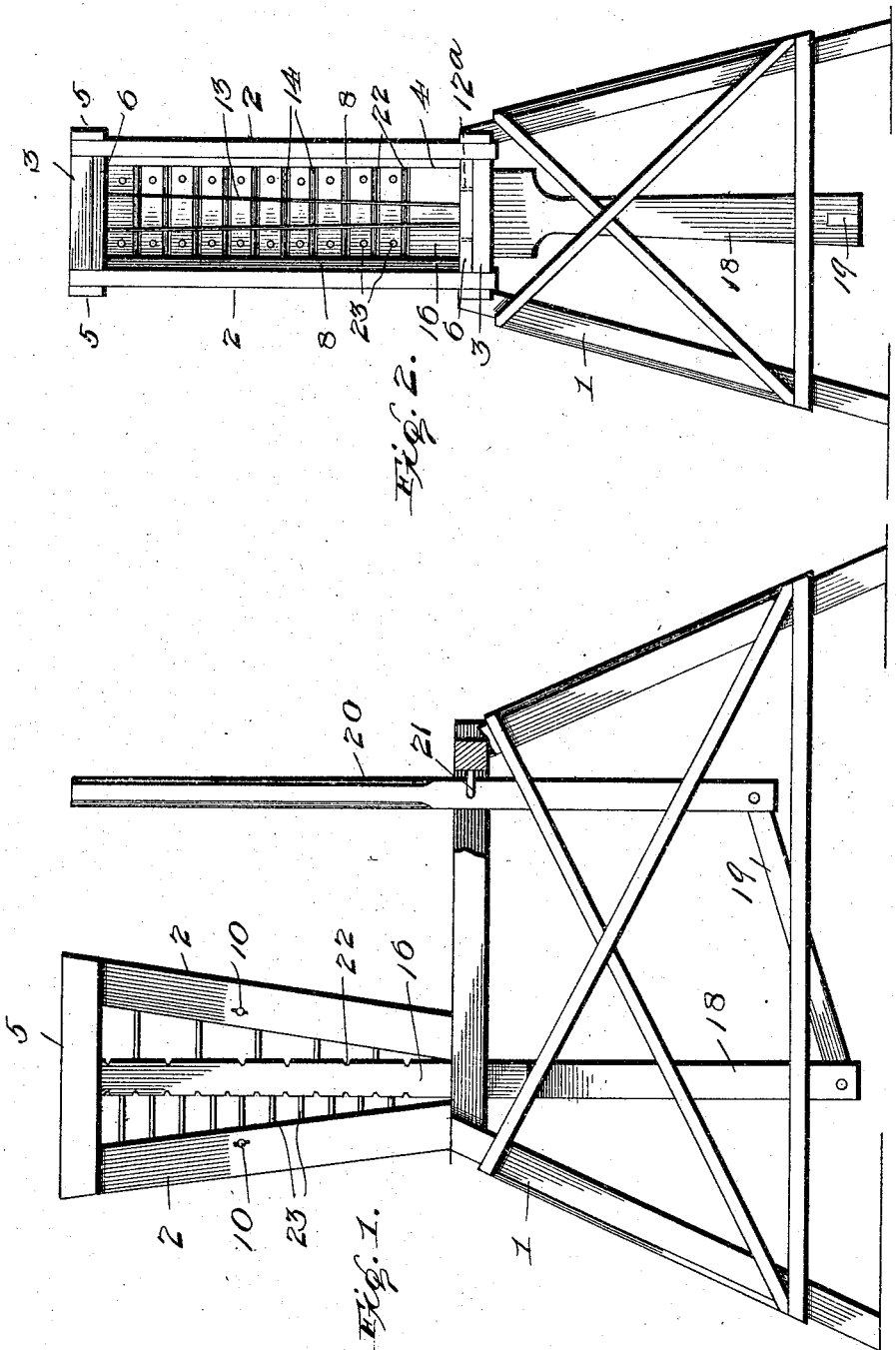

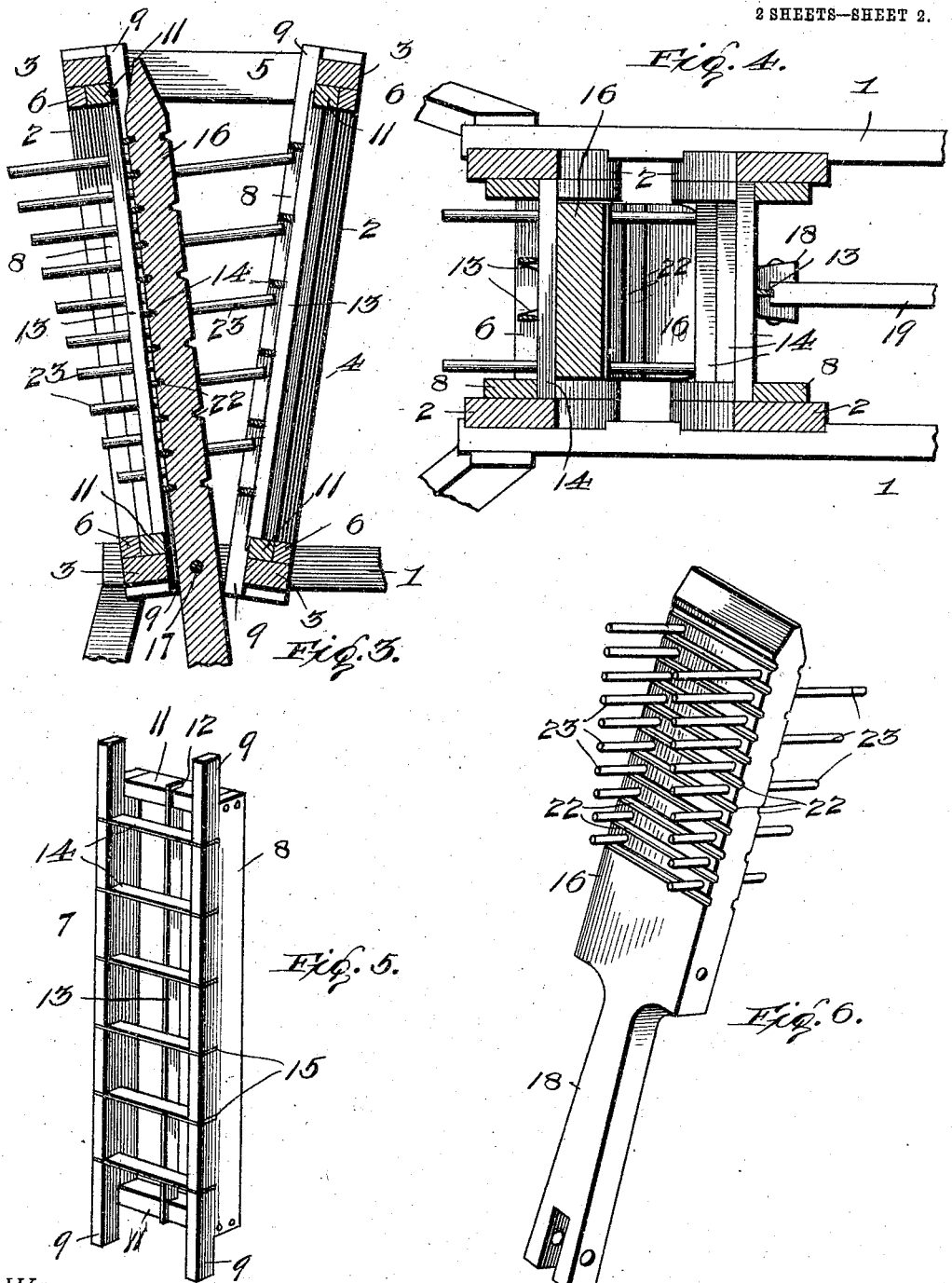

UNITED STATES PATENT OFFICE.

DANIEL J. O'KEEFFE, OF HEMINGFORD, NEBRASKA.

VEGETABLE-CUTTER.

SPECIFICATION forming part of Letters Patent No. 782,689, dated February 14, 1905.

Application filed March 17, 1904. Serial No. 198,649.

*To all whom it may concern:*

Be it known that I, DANIEL J. O'KEEFFE, a citizen of the United States, residing at Hemingford, in the county of Boxbutte and State of Nebraska, have invented certain new and useful Improvements in Vegetable-Cutters; and I do hereby declare the following to be a full, clear, and exact description of the invention, such as will enable others skilled in the art to which it appertains to make and use the same.

My invention relates to improvements in vegetable-cutters, and is more especially applicable for use in cutting up potatoes in slices or dice-like form.

The main object is to provide a simple and durable apparatus which will be double-acting in effect, and thereby greatly increase its efficiency by facilitating the operation of cutting up great quantities of the vegetables to be prepared.

Broadly speaking, the invention consists in providing a vertical feeding-trough with a plurality of spaced knives on each side thereof against which are forced the vegetables.

To more fully describe the invention, reference is had to the accompanying drawings, illustrating the same, in which like numerals designate corresponding parts in the several views, and in which—

Figure 1 is a side elevation of the apparatus; Fig. 2, an end elevation of same; Fig. 3, a fragmentary view, in longitudinal section, through the feed-trough; Fig. 4, an enlarged fragmentary view, in horizontal section, through the feed-trough; Fig. 5, a detail perspective of one of the detachable frames carrying the knives, and Fig. 6 a perspective of the presser-board.

1 is the base or supporting-frame of any suitable structure. On top of the base-support, at one end thereof, is located the feeding-trough, consisting of a hopper-like structure formed by the diverging front and rear frames comprising the side stiles 2 and the upper and lower cross-bars 3, leaving an enlarged open space 4, through which the cut-up pieces of vegetables are discharged. The upper ends of the diverging frames are held in position by the transverse bars 5.

6 designates abutment-bars extending on the inside face of each of the cross-bars 3, against which the detachable knife-frames 7 rest.

The detachable frames 7 comprise the side stiles 8, cut away at their upper and lower ends to form the tongues 9 for making a snug fit within the diverging frames. The frames may further be held rigidly in position by suitable means, such as screw-bolts 10, Fig. 1.

The cross-bars 11 of the frames 7 are set back from the front edge of the frames and are slotted at 12 to receive the longitudinal cutting-blades 13 when the vegetables are to be cut in blocks.

14 represents a plurality of transversely-disposed cutting-blades suitably secured to the side stiles 8, as within the slots 15, and preferably lie flush with the front edges of the frame.

The presser-board comprises the enlarged portion 16, pivoted at 17 to the base-frame and provided with the elongated shank 18, pivotally connected to any suitable rocking means, such as the connecting-bar 19, pivotally secured to the lower end of the lever 20, fulcrumed to the frame on the axis 21.

The enlarged portion 16 of the presser-board is provided with the transverse grooves 22, adapted to register with the cutting-blades 14, and is also provided with the longitudinal series of graduated pins 23 for holding the vegetables from transverse displacement in the feed-trough. These projecting pins 23 are disposed between the grooves 22 so as to operate between the transverse knives.

In operation the vegetables are delivered to the feed-trough on each side of the presser-board as the same is oscillated by the lever 20, and the transverse knives registering in the grooves of the presser-board insure the pieces being completely severed so as to fall through the openings 4 into any receptacle placed to receive them.

The frames 7 being detachable may be readily taken out for the purpose of cleaning them.

In the drawings I have shown the rear detachable frame provided with one central longitudinal cutting-blade and the forward one with two, converging toward each other at the lower ends. It is obvious, however, that any number of these blades may be used and their positions adjusted as provided for by the additional slots shown in dotted lines at 12ª, Fig. 2, or the longitudinal blades may be dispensed with entirely if the vegetables are simply to be sliced and not cut in blocks. I have also shown one of the frames 7 as having the transverse cutting-blades 14 spaced at greater distances apart than on the other and the slots 22 and pins 23 correspondingly disposed on the opposite faces of the presser-board, so that one side of the apparatus may cut larger pieces than the other side, if desirable.

Other obvious changes might be made without departing from the spirit of the invention, but

What I claim is—

1. In a vegetable-cutter, the combination with a feeding-trough, of knives arranged at opposite sides thereof, a pivotally-mounted presser-board operating in said trough between said knives, longitudinally-disposed side guards on said presser-board, and means for oscillating said presser-board.

2. In a vegetable-cutter, the combination with a feeding-trough, of knives arranged at opposite sides thereof, a pivotally-mounted presser-board operating in said trough between said knives, longitudinally-disposed side guards on said presser-board, comprising a plurality of projecting pins, and means for oscillating said presser-board.

3. In a vegetable-cutter, the combination with a feeding-trough, of knives arranged at opposite sides thereof, a pivotally-mounted presser-board operating in said trough between said knives, longitudinally-disposed side guards on both faces of said presser-board, comprising a plurality of projecting pins, and means for oscillating said presser-board.

4. In a vegetable-cutter the combination with a feed-trough having opposed openings therein, of a plurality of knives mounted in front of said openings, a pivotally-mounted presser-board operating in said trough between said knives, side guards on said presser-board comprising a plurality of projecting pins, and means for oscillating said presser-board.

5. In a vegetable-cutter, the combination with a feed-trough having opposed openings therein, of a plurality of knives extending transversely of said openings, a pivotally-mounted presser-bar, having transverse grooves on its opposite faces adapted to register with said knives, operating in said trough between said knives, side guards on said presser-bar comprising a plurality of longitudinally-disposed projecting pins located between said transverse grooves, and means for oscillating said presser-bar.

In testimony whereof I affix my signature in presence of two witnesses.

DANIEL J. O'KEEFFE.

Witnesses:
W. MITCHELL,
LOUISE KRAJICEK.